United States Patent [19]
Ungarelli et al.

[11] Patent Number: 5,405,949
[45] Date of Patent: Apr. 11, 1995

[54] PROCESS FOR THE SYNTHESIS OF GLYCOSAMINOGLYCANS WITH HEPARIN OR HEPARAN STRUCTURE MODIFIED IN POSITION 2 OF THE α-L-IDURONIC-2-O-SULFATE ACID

[75] Inventors: Fabrizio Ungarelli; Silvano Piani, both of Bologna, Italy

[73] Assignee: Alfa Wassermann S.p.A., Alanno, Italy

[21] Appl. No.: 206,980

[22] Filed: Mar. 7, 1994

[30] Foreign Application Priority Data

Mar. 29, 1993 [IT] Italy .................... BO93A0125

[51] Int. Cl.$^6$ ............................................. C08B 37/10
[52] U.S. Cl. ..................................... 536/21; 514/8; 514/56; 536/124; 530/322; 530/345
[58] Field of Search ............... 514/8, 56; 536/21, 124; 530/322, 345

[56] References Cited

U.S. PATENT DOCUMENTS

| | | | |
|---|---|---|---|
| 4,987,223 | 1/1991 | Choay et al. | 536/17.7 |
| 5,010,063 | 4/1991 | Piani et al. | 514/56 |
| 5,104,860 | 4/1992 | Piani et al. | 514/56 |

FOREIGN PATENT DOCUMENTS

| | | |
|---|---|---|
| 0347588 | 12/1989 | European Pat. Off. |
| 0380943 | 8/1990 | European Pat. Off. |

OTHER PUBLICATIONS

Gallagher J. T., Walker A. Molecular distinctions between heparan sulphate and heparin. Analysis of sulphation patterns indicates that heparan sulphate and heparin are separate families of N-sulphated polysaccharides. Biochem. J. 1985:230:665–74.

Turnbull, J. E., Gallagher J. T. Distribution of iduronate 2-sulphate residues in heparan sulphate. Evidence for an ordered polymeric structure. Biochem. J. 1991:273:553–559.

Lindahl U., Kjellen L. Heparin or Heparan Sulfate—What is the Difference? Thrombosis and Haemostasis-F. K. Schattauer Verlagsgesellschaft mbH (Stuttgart) 66 (1)44–36 (1991).

Jaseja et al. Can. J. Chem. 1989, 67, 1449–1456.

*Primary Examiner*—Douglas W. Robinson
*Assistant Examiner*—Kathleen Kahler Fonda
*Attorney, Agent, or Firm*—Bucknam and Archer

[57] ABSTRACT

A process for the synthesis of glycosaminoglycans with heparin or heparan structure modified in position 2 of the α-L-iduronic-2-O-sulfate acid in which the sulfate group is, entirely or in part, substituted with a nucleophilic group, is described. The process is carried out by treating glycosaminoglycans having heparin or heparan structure with a nucleophilic reagent in alkaline solution.

8 Claims, No Drawings

PROCESS FOR THE SYNTHESIS OF GLYCOSAMINOGLYCANS WITH HEPARIN OR HEPARAN STRUCTURE MODIFIED IN POSITION 2 OF THE α-L-IDURONIC-2-O-SULFATE ACID

SUMMARY OF THE INVENTION

A process for the synthesis of semi-synthetic glycosaminoglycans of general formula III

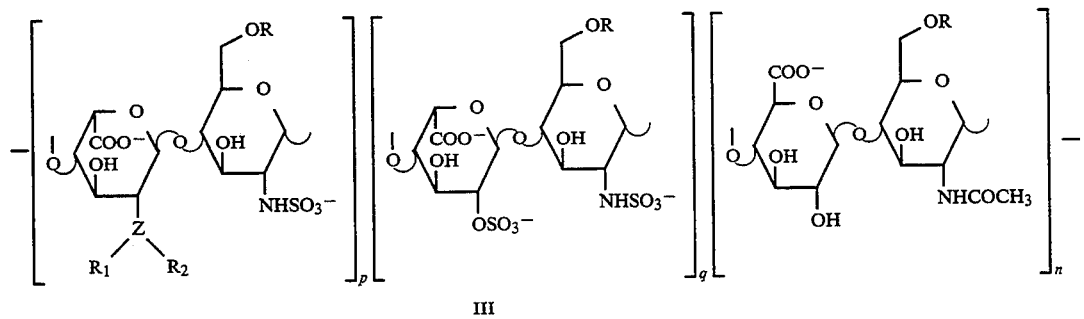

III with heparin or heparan structure modified in position 2 of the α-L-iduronic-2-O-sulfate acid in which the sulfate group is, entirely or in part, substituted with a nucleophilic group is described. Said process is carried out by treating glycosaminoglycans with heparin or heparan structure by means of a nucleophilic agent in alkaline medium.

BACKGROUND OF THE INVENTION

In the U.S. Pat. No. 5,010,063 a description was given of a structural modification, in basic medium, of glycosaminoglycans with heparin and heparan structure with subsequent isolation from the reaction mixture of new derivatives with respect to the state of the art, as demonstrated unmistakably by the chemical and physical characteristics and especially by the $^{13}$C-NMR spectrum.

In the subsequent U.S. Pat. No. 5,104,860 a further structural modification was described, in a basic or neutral medium, which, starting from the products formed in the reaction conditions described in U.S. Pat. No. 5,010,063, and from the glycosaminoglycans with heparin or heparan structure used as starting products in the same patent, originated a range of new products, different from those described in said patent and new with respect to the state of the art, as demonstrated unmistakably by the chemical and physical characteristics and especially by the $^{13}$C-NMR spectrum.

The chemical and physical characteristics of the products described in U.S. Pat. No. 5,010,063 and the results of a subsequent structural study described by Jaseia M., Rej R., Sauriol F., Perlin A. S. in Can. J. Chem 67, 1449–56 (1989), with the specific aim of explaining the mechanism of the reaction of structural modification in a basic medium, have demonstrated that these derivatives show a modification which concerns just one of the monosaccharide units characteristic of glycosaminoglycans with heparin or heparan structure, more specifically the unit of α-L-iduronic acid sulfated in position 2 and involving its transformation into a 2,3-epoxygulonic unit. The so obtained epoxides are represented from the following general formula IV

IV

Likewise it has been demonstrated that semi-synthetic glycosaminoglycans with one 2,3-epoxygulonic unit and also glycosaminoglycans with heparin or heparan structure, in conditions of reaction similar to those described in U.S. Pat. No. 5,104,860, undergo a structural modification which also concerns the saccharide unit of α-L-iduronic acid sulfated in position 2 and involving the transformation of this saccharide unit into a unit of non-sulfated α-L-iduronic acid or α-L-galacturonic acid, according to the conditions of reaction used.

So U.S. Pat. No. 5,010,063 describes semi-synthetic glycosaminoglycans containing an epoxy function between positions 2 and 3 of the unit of α-L-iduronic-2-O-sulfate acid taken as a starting point and the conditions of reaction necessary for obtaining them, while U.S. Pat. No. 5,104,860 describes products deriving from further transformation of the epoxide, confirmed as having one unit of non-sulfated α-L-iduronic or α-L-galacturonic acid, and the conditions of reaction necessary for obtaining them starting from the epoxide itself or, as an alternative, starting from the glycosaminoglycans with heparin or heparan structure themselves, used as starting products in U.S. Pat. No. 5,010,063.

Subsequently, in the published European patent application EP 565.863 a description was given of semisynthetic glycosaminoglycans in which one of the saccharide units characteristic of glycosaminoglycans with heparin or heparan structure, more specifically that containing α-L-iduronic-2-O-sulfate acid, has undergone, totally or partly, a structural modification in position 2, position in which the sulfate group has been substituted with a nucleophilic group. The process claimed in said published European patent application describes the obtaining of the semi-synthetic glycosaminoglycans of general formula III

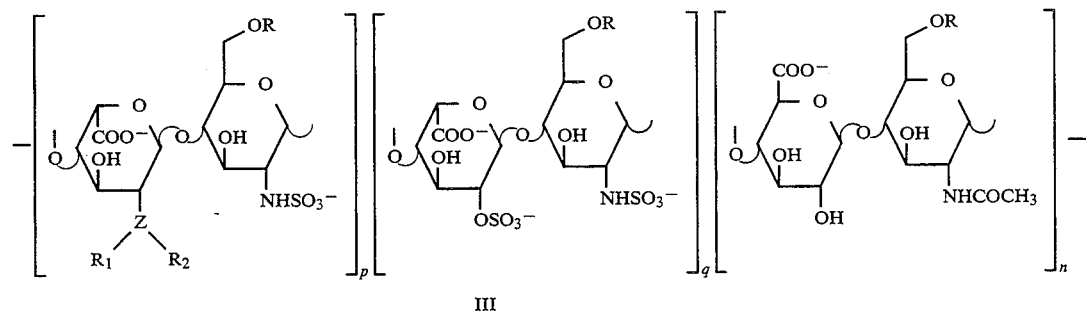

III by treating the epoxides of formula IV, described in U.S. Pat. No. 5,010,063 with a nucleophilic agent.

Object of the present invention is a new process for the preparation of semisynthetic glycosaminoglycans of general formula III directly starting from the glycosaminoglycans with heparin or heparan structure of general formula I obtaining it by means of two consecutive reactions, the first of which includes the process of synthesis, isolation and purification of the epoxide of formula IV starting from the glycosaminoglycan of formula I, is evident as regards the overall yield and the industrial cost.

To better define the field of the present invention, we would like to point out that the expression glycosaminoglycans with heparin or heparan structure is intended to indicate polysaccharides with a molecular weight of between about 3000 and about 50000 Daltons and characterized by the fact of possessing a disaccharide unit consisting of a uronic acid (which may be α-L-iduronic or β-D-glucuronic) and of α-D-glucosamine, connected, in alternate sequences, by 1,4-glycosidic bonds as described by Lindhal U., Kjellen L. in Thrombosis and Haemostasis 66, 44–48 (1991) and by Turnbull J. E., Gallagher J. T. in Biochem. J. 273,553–559 (1991).

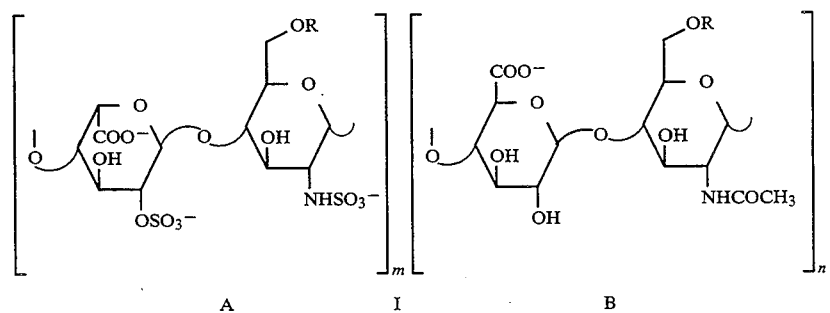

A  I  B

This new process represents an improvement of the process described in the published European patent application EP 565.863 because it uses as starting product the glycosaminoglycan of formula I while in said published European patent application the starting product was the epoxide derivative of formula IV obtained in its turn from the glycosaminoglycan of formula I according to the process described in U.S. Pat. No. 5,010,063. The advantage of directly obtaining the product of formula III in only one reaction by starting from the glycosaminoglycan of formula I instead of Since the α-L-iduronic acid can be sulfated in position 2 and the glucosamine can be N- acetylated, N-sulfated, 6-O-sulfated, 3-O-sulfated, according to the variable positions of the substituents, at least 10 different disaccharide units are possible, whose combination may generate a large number of different sequences. Bearing in mind the most represented disaccharide units and the most frequent sequences, we can say with reasonable approximation, that the general formula I can be attributed to glycosaminoglycans with heparin or heparan structure

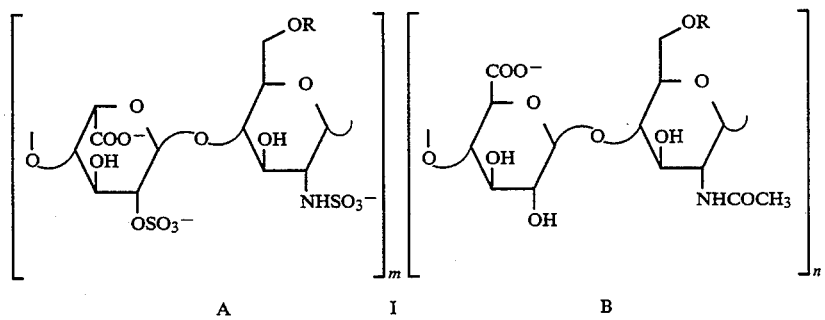

where R represents hydrogen or the sulfate residue ($SO_3^-$) and where m and n are whole numbers between 1 and 100.

In heparin structured glycosaminoglycans of natural origin the value of m is high and the disaccharide unit A represents about 80% of the disaccharide units; on the contrary, in heparan structured glycosaminoglycans of natural origin the value of n is high and the disaccharide unit B represents about 80% of the disaccharide units.

can be applied to glycosaminoglycans with heparin or heparan structure which present all the possible sequences; ie. it is independent of the type and of the level of functionalization of the saccharide unit which precedes or follows in the sequence the unit of α-L-iduronic-2-O-sulfate acid which is the object of the reaction of structural modification.

The structure of the new products is represented by the general formula III

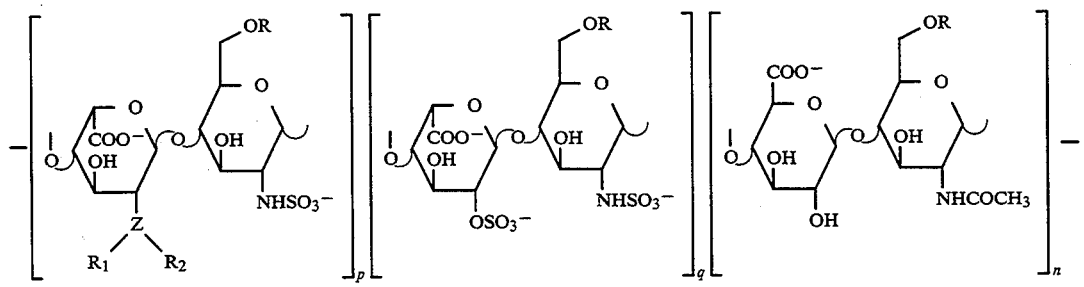

The general formulae I and III are intended to reveal the composition of the main saccharide units but make no reference to their sequence.

As is known to experts in the art, it is possible to make a chemical modification of glycosaminoglycans of natural origin, for example through reactions of N-desulfatation, possibly followed by reactions of N-acetylation, thus also obtaining semi-synthetic N-desulfated heparins or N-desulfated-N-acetylated heparins. In addition, these glycosaminoglycans, whether natural or semi-synthetic, may be subjected to depolymerization processes by means of which the molecular weight is taken to levels generally between 3000 and 10000 Daltons.

The structural modification described in this invention for obtaining new semi-synthetic glycosaminoglycans with heparin or heparan structure refers to the unit of α-L-iduronic-2-O-sulfate acid where the partial or total selective substitution of the O-sulfate group in position 2 with a nucleophilic residue, whatever it might be the desired compound with heparin or heparan structure, takes place. Indeed, besides being selective, the chemical process described in this invention where $p+q=m$, with p other than 0, and m, n and R have the meaning as seen above, and where $-Z(R_2)R_1$ represents the nucleophilic group introduced through the process described in this invention.

The reaction of structural modification which involves the partial or total introduction of the nucleophilic group in position 2 of the α-L-iduronic acid does not lead to the depolymerization of the glycosaminoglycans or alteration in the distribution of the molecular weight of the polysaccharide chains which form them, and for this reason the present reaction can be applied to glycosaminoglycans with heparin or heparan structure of any molecular weight. The products obtained can however be subjected to the known processes of chemical or enzymatic depolymerization.

DETAILED DESCRIPTION OF THE INVENTION

Object of the present invention is a new process for obtaining semi-synthetic glycosaminoglycans with heparin or heparan structure in which the original structure of general formula I

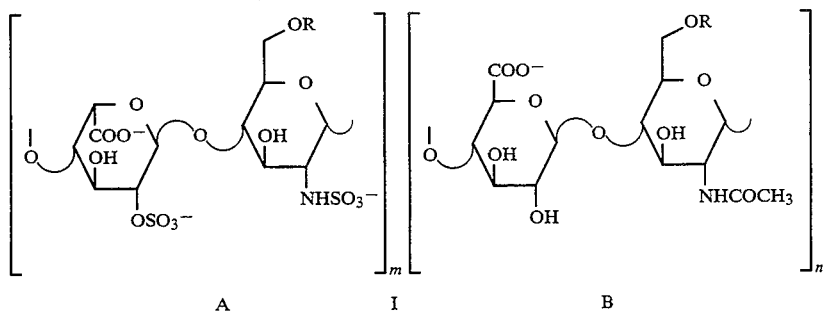

in which R represents hydrogen or the sulfate residue (SO$_3^-$) and m and n are whole numbers with values between 1 and 100, has undergone a structural modification in position 2 of the α-L-iduronic-2-O-sulfate acid with partial or total transformation of 2-O-sulfate group with a nucleophilic radical of general formula II

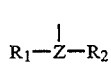

II with formation of semi-synthetic glycosaminoglycans with heparin or heparan structure of general formula III

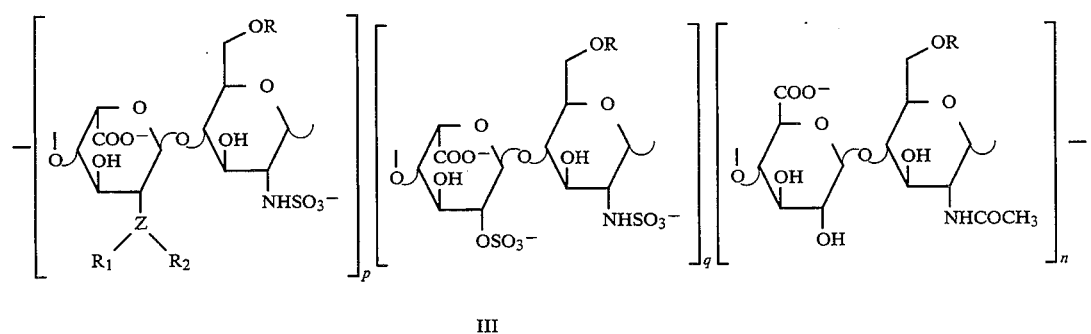

III where p+q=m, with p other than 0, and m, n and R have the meaning defined above. All the nucleophilic reagents may be used to advantage in carrying out this invention and in fact the radical —Z(R$_2$)R$_1$ includes any type of nucleophilic reagent.

More specifically, Z represents oxygen, sulphur or nitrogen, R$_1$ represents the straight or branched (C$_{1-12}$) alkyl, aminio, aryl, diazo or hydroxyl groups, substituted or not substituted and R$_2$ is zero or hydrogen or a straight or branched (C$_{1-6}$) alkyl radical, or taken with R$_1$ forms a heterocyclic ring.

The radicals deriving from primary or secondary amines, secondary heterocyclical amines, aminoalcohols, aminothiols, amino acids, aminoesters, peptides, alcohols, phenols, mercaptans, dithiols, thiophenols, hydroxylamines, hydrazines, hydrazides and sodium azide are preferred in performing the present invention.

Particularly preferable in performing this present invention are the radicals —Z(R$_2$)R$_1$ originating from the following nucleophilic reagents: glycine, glycylglycine, L-cysteine, acetyl-L-cysteine, L-cysteine ethyl ester, 2-aminothiophenol, 1,3-propandithiol, cysteamine, sodium azide, 2-aminoethyl hydrogensulfate, taurine, thioglycolic acid, β-alanine ethyl ester, L-cystine, hydroxylamine, glycyltautine, cysteinyltaurine, glycylcysteine, glycylphenylalanine, glycyltyrosine, 2-aminoethanol, glycine 2-aminoethyl ester, glycine 2-hydroxyethyl amide, arginyllsine, arginine, lysine, acetic acid 2-aminomethyl ester, salicylic acid, methionine, glycylproline, γ-aminobutyric acid, lysylprolylarginine, threonyllysylproline, threonyllysine, prolylarginine, lysylproline, choline, 4-(3-aminopropyl)-2-hydroxybenzoic acid and 4-(2-aminoethyl)-2-hydroxybenzoic acid.

The process for obtaining semi-synthetic glycosaminoglycans with heparin or heparan structure of general formula III involves reacting a glycosaminoglycan with heparin or heparan structure of general formula I with a nucleophilic reagent whose radical is included in the general formula II, in aqueous solution and in the presence of a quantity of inorganic or organic base able to salify any acid groups present in the nucleophilic reagents and/or to free the same nucleophilic reagents from any salts they may have with substances of an acid nature and to create such an excess of alkalinity that the reaction mixture becomes from 0.01N to 1N with respect to the base used, preferably from 0.5N to 1N. The reaction is carried out by dissolving in water, at a concentration comprised between 1% and 5%, the glycosaminoglycan with heparin or heparan structure of formula I and by adding an aqueous solution containing the nucleophilic reagent and an inorganic or organic base to this solution. The quantity of nucleophilic agent is comprised between 1 and 200 molar equivalents, preferably between 10 and 100 molar equivalents, with respect to the dimeric unit of the glycosaminoglycan of formula I.

Alkaline or alkaline-earth hydroxides, preferably sodium or potassium hydroxide, are used as inorganic bases, while tertiary amines like triethylamine are preferably used as organic bases.

The reaction mixture is kept under stirring, possibly in an atmosphere of inert gas, preferably nitrogen, where the nucleophilic reagent is easily oxidizable, at a temperature of between 0° C. and 50° C., preferably between 10° C. and 40° C., for a period of time of between 2 and 120 hours, preferably between 24 and 96 hours.

At the end of the reaction, after a possible cooling, the reaction mixture is given a neutral pH by adding an aqueous solution of hydrochloric acid. The excess of nucleophilic reagent may optionally be removed, for example through extraction with a solvent which is not miscible with water, with chloroform or diethyl ether, or through filtration where it is not soluble in aqueous medium with neutral pH. The clear aqueous solution may be further purified at a later stage through dialysis, cut off 3000 Daltons, first in running water and then in distilled water. Finally the semi-synthetic glycosaminoglycan with heparin or heparan structure of general formula III is isolated through lyophilization of the aqueous solution which contains it or through precipitation on addition of a suitable solvent.

The examples below are a further illustration of the invention but they must not be taken as a limitation of the invention itself.

EXAMPLE 1

Semi-synthetic glycosaminoglycan with heparin structure of general formula III in which —Z($R_2$)$R_1$ corresponds to glycyl.

A solution containing 3760 mg of glycine and 2500 mg of sodium hydroxide in 22,5 ml of water is added, at room temperature, to a solution containing in 2,5 ml of water 500 mg of heparin sodium salt.

The reaction mixture is kept under stirring at room temperature for 48 hours, then pH is neutralized through the addition of hydrochloric acid and the solution is then subjected to dialysis, cut off 3000 Daltons, for 12 hours in running water and for 6 hours in distilled water. The solution is then lyophilized and 480 mg of product are obtained.

EXAMPLE 2

Semi-synthetic glycosaminoglycan with heparin structure of general formula III in which —Z($R_2$)$R_1$ corresponds to (S)-L-cysteinyl.

The reaction is performed in the same conditions as described in example 1 using 8780 mg of L-cysteine monohydrate hydrochloride instead of mg of glycine and 4500 mg of sodium hydroxide instead of 2500 mg.

520 Mg of product are obtained.

EXAMPLE 3

Semi-synthetic glycosaminoglycan with heparin structure of general formula III in which —Z($R_2$)$R_1$ corresponds to (S)-2-aminophenylthio.

The reaction is performed in the same conditions as described in example 1 using 6300 mg of 2-aminothiophenol instead of 3760 mg of glycine and extending the reaction time to 72 hours. At the end of the reaction, after having neutralized the pH through the addition of hydrochloric acid, the excess of aminothiophenol is eliminated by extracting it with chloroform. The aqueous solution is then subjected to dialysis and lyophilization, as described in example 1, obtaining 530 mg of product.

EXAMPLE 4

Semi-synthetic glycosaminoglycan with heparin structure of general formula III in which —Z($R_2$)$R_1$ corresponds to (S)-carboxymethylthio.

The reaction is performed in a nitrogen atmosphere in the same conditions as described in example 1 using 7416 mg of thioglycolic acid and 6900 mg of sodium hydroxide in 20 ml of water and extending the reaction time to 72 hours.

400 Mg of product are obtained.

We claim:

1. A process for the synthesis of a product glycosaminoglycan having the formula

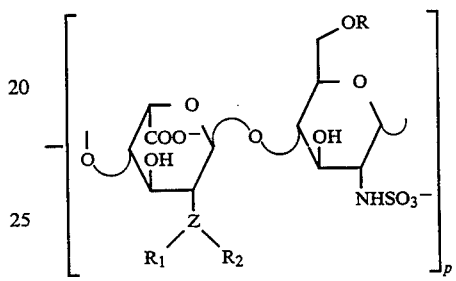

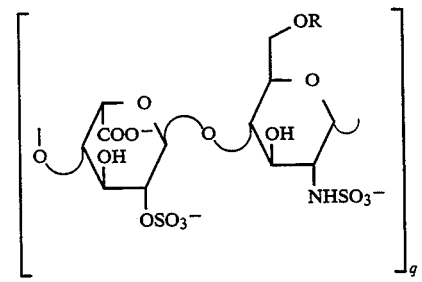

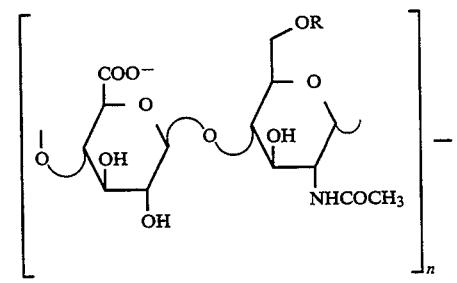

having the disaccharide unit of α-L-iduronic acid, of molecular weight between 3,000 and 50,000 Daltons wherein p+q=m, with p other than 0, and m and n are whole numbers between 1 and 100, R is hydrogen or the sulfate residue —$SO_3^-$ and —Z($R_2$)$R_1$ is a nucleophilic group, wherein Z is sulphur or nitrogen and when Z is nitrogen, $R_1$ is a member selected from the group consisting of substituted or unsubstituted straight $C_1$–$C_{12}$ alkyl, branched $C_3$–$C_{12}$ alkyl, amino, aryl, and hydroxy groups, and $R_2$ is a member selected from the group consisting of hydrogen, straight $C_1$–$C_6$ alkyl, branched $C_3$–$C_6$ alkyl, and when Z is sulfur, and when $R_1$ is diazo, $R_2$ is absent or Z is nitrogen, and $R_1$ and $R_2$ together with Z form a heterocyclic ring, which consists of reacting a reactant glycosaminoglycan having the formula

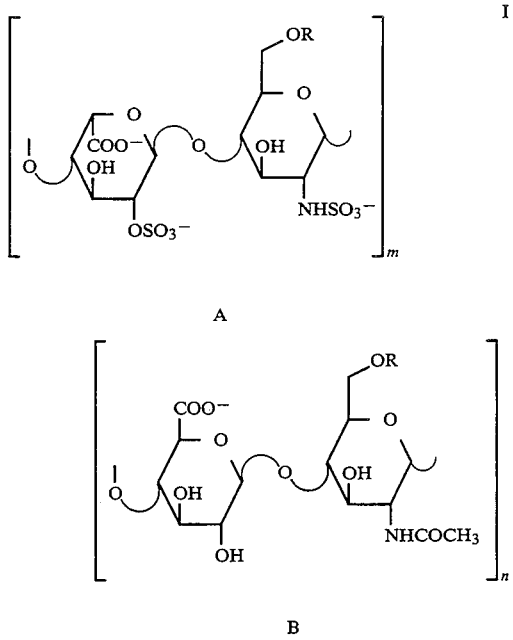

A

B with
a) a nucleophilic reagent containing said group

b) or a salt of said nucleophilic reagent and when said $R_1$ is substituted by an acidic group or when the reaction is carried out with a salt of said nucleophilic reagent in the presence of a quantity of a base sufficient to salify said acidic group or to release said nucleophilic reagent from the salt thereof and sufficient to create an excess of alkalinity between 0.01N to 1N with respect to said base, in an aqueous solution of concentration 1-5%, under stirring for a period of time between 2 and 120 hours at a temperature between 0° and 50° C., adjusting the pH of said aqueous solution to neutrality by addition of an aqueous solution of hydrochloric acid, subjecting said aqueous solution to dialysis, first with tap water and then with distilled water and isolating said product, glycosaminoglycan by lyophilization of said aqueous solution, said product glycosaminoglycan being free of depolymerization with respect to said reactant glycosaminoglycan and exhibiting antithrombotic and thrombolytic activity essentially equivalent to heparin with lower risk of hemorrhage.

2. The process according to claim 1 wherein said reactant glycosaminoglycan has a disaccharide unit and the quantity of nucleophilic agent is between 10 and 100 molar equivalents with respect to said disaccharide of the reactant glycosaminoglycan.

3. The process according to claim 1 wherein said base is sodium hydroxide, potassium hydroxide or triethylamine and the excess of alkalinity is such that the reaction mixture becomes from 0.5N to 1N with respect to the base used.

4. The process according to claim 1 wherein said nucleophilic reagent is a member selected from the group consisting of glycine, glycylglycine, L-cysteine, acetyl-L-cysteine, L-cysteine ethyl ester, 2-aminothiophenol, 1,3-propanedithiol, cysteamine, sodium azide, 2-aminoethyl hydrogen sulfate, taurine, thioglycolic acid, β-alanine ethyl ester, L-cystine, hydroxylamine, glycyltaurine, cysteinyltaurine, glycylcysteine, glycylphenylalanine, glycyltyrosine, 2-amino-ethanol, glycine 2-aminoethyl ester, glycine 2-hydroxyethyl amide, arginyllysine, arginine, lysine, acetic acid 2-aminoethyl ester, salicylic acid, methionine, glycylproline, γ-aminobutyric acid, lysylprolylarginine, threonyllysylproline, threonyllysine, prolylarginine, lysylproline, choline, 4-(3-aminopropyl)-2-hydroxybenzoic acid and 4-(2-aminoethyl)-2-hydroxybenzoic acid.

5. The process according to claim 1 wherein said nucleophilic reagent is glycine and the product has the formula

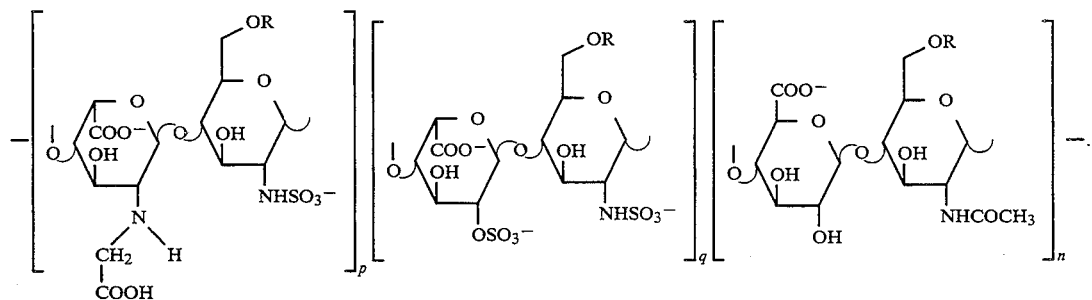

6. The process as to claim 2 wherein said nucleophilic reagent is cysteine and the product has the formula

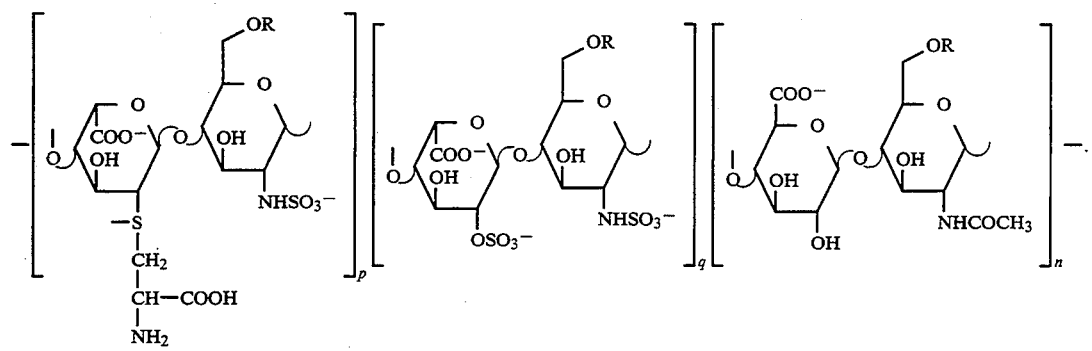
7. The process according to claim 1 wherein said nucleophilic reagent is 2-amino-thiophenol and the product has the formula
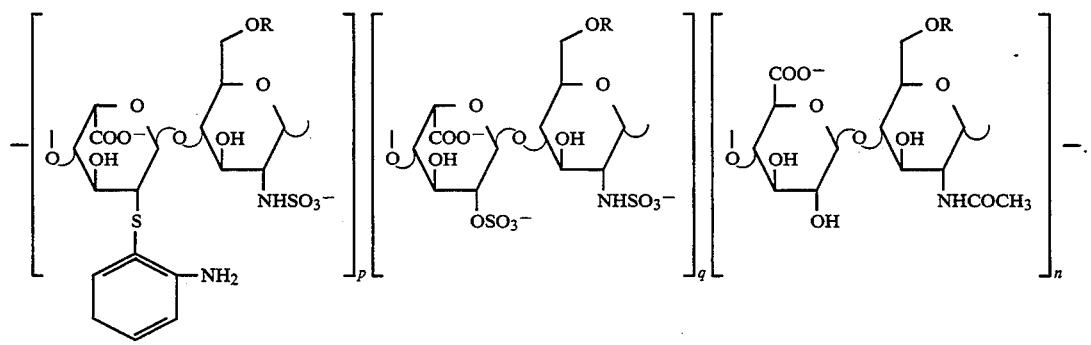
8. The process according to claim 1 wherein said nucleophilic reagent is thioglycolic acid and the product has the formula
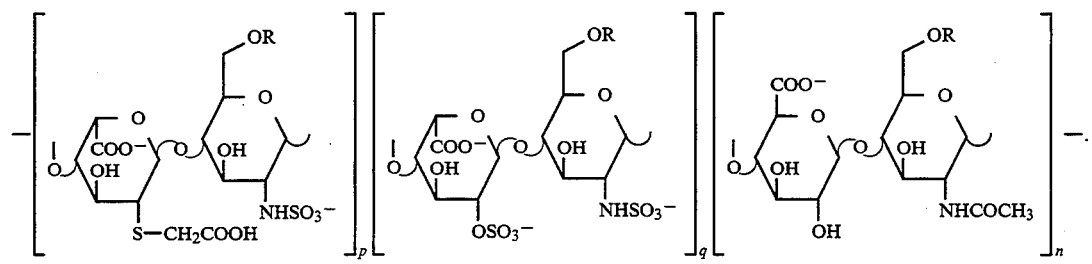
* * * * *